UNITED STATES PATENT OFFICE 2,410,541

POLYHALOGENATED OLEFINS

Robert M. Joyce, Jr., Marshallton, Del., assignor to E. I. du Pont de Nemours & Company, Wilmington, Del., a corporation of Delaware No Drawing. Application April 10, 1942, Serial No. 438,468

6 Claims. (Cl. 260—654)

This invention relates to a new class of polyhalogenated olefins and to processes for preparing such compounds.

In copending application Serial No. 438,466, filed April 10, 1942 (C. C. D. 1954), there is described a new process which is called "telomerization." This telomerization process is applicable to many classes of compounds. In a specific embodiment of this process, chloroform can be reacted with polymerizable aliphatic monoolefinic hydrocarbons to produce new chlorinated hydrocarbons having three chlorine atoms on the terminal carbon atom. Also, carbon tetrachloride can be reacted with polymerizable aliphatic monoolefinic hydrocarbons to produce new chlorinated hydrocarbons having three chlorine atoms on one terminal carbon atom and one chlorine atom on the other terminal carbon atom. Moreover, trichlorofluoromethane can be substituted for the carbon tetrachloride. These classes of compounds may be expressed by a single general formula as follows:

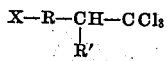

wherein X is hydrogen or halogen, R is a divalent hydrocarbon radical, and R' is a hydrogen or a monovalent hydrocarbon radical. These new saturated chlorinated hydrocarbons present a source of new types of chlorinated olefins having the general type formula

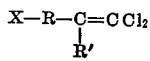

wherein X, R, and R' have the same meanings as before.

It is known to the art that compounds containing the group RCHClCCl$_3$ can be dehydrochlorinated to compounds containing the group RCCl=CCl$_2$. For example, Prins (Rec. trav. chim. 54, 249 (1935)) converted pentachloroethane to tetrachloroethylene by heating with a small quantity of aluminum chloride at 100° C. to 110° C. Similarly, symmetrical heptachloropropane was converted to hexachloropropene by heating with aluminum chloride in carbon tetrachloride solution at 70° C.

Alkaline reagents have also been employed to effect similar dehydrochlorinations. Prins (J. prakt Chem. 89, 414 (1914)) converted 1,1,1,2,3,3-hexachloropropane to 1,1,2,3,3-pentachloropropene-1 with alcoholic sodium hydroxide.

It is an object of this invention to produce new homologues of vinylidene chloride having the general formula

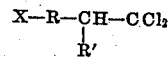

wherein X is hydrogen or halogen, R is a divalent hydrocarbon radical, and R' is hydrogen or a monovalent hydrocarbon radical. Another object is to provide processes for preparing such new compounds. A still further object is to discover optimum conditions for the preparation of such compounds. Other objects will appear hereinafter.

These objects have been accomplished by the discovery that compounds of the formula

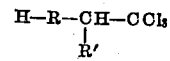

wherein X, R, and R' have the same significance as were hereinbefore stated, can be dehydrochlorinated to produce the desired chloroolefins. Where the raw materials are of sufficiently low molecular weight to be in the gaseous form or to be vaporized at reaction temperatures, the dehydrochlorination reaction is preferably carried out in the vapor phase by passing the raw material with steam over a catalyst at elevated temperatures.

It has been found that the objects of the invention can also be attained by dehydrochlorinating the said raw materials in the liquid phase by heating them to elevated temperatures in the presence of a halide type Friedel-Crafts catalyst, preferably in the presence of a hydroxylic promoter.

Moreover, the dehydrochlorination in the liquid phase can be effected by heating the raw materials with alkaline reagents, such as, for example, oxides and hydroxides of alkali and alkali earth metals and also with tertiary amines and with aliphatic amides. In general, however, the catalytic processes are preferred to those employing alkaline reagents. This preference is based on the facts that catalytic processes are easier to control, are quicker, and that they give rise to gaseous hydrogen chloride, which is a valuable by-product, rather than to the relatively worthless alkali or ammonium chlorides.

Still further, it has been discovered that hydrogen chloride can be removed from the type of raw materials above identified by heating them under pressure to 200° C. in the presence of water or dilute sulphuric acid. This method of dehydrochlorination, however, is less advantageous in that it is slow and requires pressure equipment capable of resisting aqueous hydrochloric acid at high temperatures.

In carrying out the vapor phase dehydrochlorination, a tube which is set vertically in a furnace is conveniently used as a reactor. The upper part of this tube is packed with an inert material such as granular quartz which serves as a vaporizing section. Below this section, there is placed a bed of the catalyst which may be, for example, a heteropoly acid, such as phosphotungstic acid, deposited on a suitable carrier such as 8–14 mesh silica gel. Water and the compound containing the trichloromethyl group are conducted from separate reservoirs into the upper end of the reactor. In general, it is preferable to use 5–15 molecular equivalents of water, based on the trichloromethyl compound, and to adjust the feed rates so that operation is at a space velocity of about 2 cc. of total liquid feed per cc. of catalyst per hour. The catalyst bed and the vaporizing section are maintained at a temperature of about 300° C.

The products issuing from the reactor are condensed and the two liquid phases are separated. If desired, a volatile solvent, such as carbon tetrachloride, methylene chloride, etc., can be added during the separation and subsequent washing operations. The organic layer is washed free of hydrogen chloride with alkali hydroxide or carbonate, and finally with water, dried, and purified, if desired, by distillation.

The liquid phase catalytic dehydrochlorination can be carried out by heating the halogenated compound in the presence of a halide-type Friedel-Crafts catalyst, such as zinc chloride, and a promoter such as water or acetic acid, at 100–200° C. Agitation is generally provided since it facilitates the elimination of the gaseous hydrogen chloride. When the evolution of hydrogen chloride has ceased, the crude product is decanted from the gummy catalyst, a solvent is added, if desired, and the product is washed free of hydrogen chloride with alkali carbonate and water. After removal of the solvent, the product can be purified by distillation if sufficiently volatile or by crystallization if it is a high molecular weight solid material. Because of the clean-cut nature of the foregoing reaction, the products thereof are suitable for many uses without further purification.

Alkaline reagents are also capable of effecting the dehydrochlorination of such compounds. For example, this reaction can be carried out by heating the trichloromethyl compound with an alcoholic solution of sodium or potassium hydroxide. In the case of compounds containing the group —$CH_2CCl_3$, however, more than one molecule of hydrogen chloride may be split out by this mode of dehydrochlorination, giving rise to a chloro-acetylene.

The trichloromethyl compounds which serve as raw materials for this invention can be prepared conveniently by the process of telomerization, as described in copending application Serial No. 438,466, filed April 10, 1942 (C. C. D. 1954). For example, by the telomerization of ethylene and carbon tetrachloride, i. e., the reaction thereof preferably at 60–150° C. and 20–1000 atmospheres in the presence of a catalyst such as benzoyl peroxide, there is produced a series of compounds of the general formula $$Cl(CH_2CH_2)_nCCl_3$$

wherein $n$ is an integer greater than one. By either of the catalytic dehydrochlorination processes, these compounds can be converted to the desired compounds $$Cl(CH_2CH_2)_{n-1}CH_2CH=CCl_2$$

Similarly, the telomerization of ethylene and chloroform gives a series of compounds of the general formula $H(CH_2CH_2)_nCCl_3$ which, on dehydrochlorination, give compounds of the formula $H(CH_2CH_2)_{n-1}CH_2CH=CCl_2$. This process may likewise be applied to the telomerization products of chloroform, carbon tetrachloride, trichlorobromomethane, trichloroiodomethane, or trichlorofluoromethane with any polymerizable aliphatic monoolefinic hydrocarbons which are so constituted that there is a hydrogen on the carbon adjacent to the trichloromethyl group.

In order that the invention may be more fully understood, the following examples are given by way of illustration, but it is to be understood that the invention is not limited thereto as will be more specifically pointed out hereinafter.

*Example I*

The reactor consists of a catalyst tube mounted in an electrically heated furnace equipped with an inlet manifold at the upper end, and an exit tube at the lower end leading to a condenser. The lower part of the tube is packed with phosphotungstic acid deposited on 8–14 mesh silica gel, and the upper portion, about ¼ to ⅓ the total length of the heated reactor, which serves as a vaporizer, is packed with short lengths of small bore glass tubing. The vaporizer and catalyst zone are heated to a temperature of 300–310° C. and the reactants are then admitted through the inlet manifold. These reactants are 1,1,1,5-tetrachloropentane, one of the products of the telomerization of ethylene and carbon tetrachloride, and water. These are admitted to the inlet manifold at rates of 0.845 and 1.414 parts by volume per minute, respectively. These rates correspond to 14.5 moles of water per mole of tetrachloropentane, and the combined liquid feed rate corresponds to a space velocity of 1.94 parts by volume of liquid feed per part by volume of catalyst per hour. A total of 177.4 parts by volume (240 parts by weight) of the tetrachloropentane is passed over the catalyst under these conditions.

Carbon tetrachloride is added to the crude reaction product, which is then separated from the aqueous layer and washed with dilute aqueous sodium carbonate and with water. After drying over anhydrous magnesium sulfate, the solvent is removed by distillation, and the product is distilled through a precision column to furnish 139 parts by weight (76.7 per cent of the theoretical) of 1,1,5-trichloropentene-1. This compound is a colorless liquid which boils at 89° C. under 23 mm. pressure, has an $n_D^{25}$ of 1.4878 and a $d_4^{25}$ of 1.2893. The product is best stored in a closed bottle in an atmosphere of nitrogen or in the presence of a little hydroquinone to prevent the oxidation to which it is subject when exposed to the air.

*Example II*

Example I is repeated using as catalyst 8–14 mesh granular borophosphoric acid and a catalyst temperature of 255° C. Water is admitted at the rate of 1 part by volume of liquid per minute, and 1,1,1,5-tetrachloropentane at the rate of 0.9 part by volume per minute. This corresponds to 9.65 moles of water per mole of tetrachloropentane, and the combined liquid feed to a space velocity of 1.63 parts by volume of liquid feed per part by volume of catalyst per hour.

Under these conditions, there is obtained a 74 per cent conversion of the tetrachloropentane, and an 82.6 per cent yield of 1,1,5-trichloropentene-1.

When zinc chloride deposited on alumina is used as catalyst, at a temperature of 255° C., there is obtained, in addition to the 1,1,5-trichloropentene-1, a lower boiling chlorinated hydrocarbon which appears to result from the removal of 2 moles of hydrogen chloride from the tetrachloropentane molecule. The value of the heteropoly acids as catalysts in promoting a clean-cut splitting out of one molecule of hydrogen chloride is thereby indicated.

*Example III*

A mixture of 42 parts by weight of 1,1,1,5-tetrachloropentane, 0.5 part by weight of anhydrous zinc chloride, and 12 parts by weight of glacial acetic acid is heated and stirred at 110–120° C. for 3 hours. At the end of this time, the evolution of hydrogen chloride has practically ceased, and the mixture is decanted from the gummy catalyst and distilled directly. After distillation of the acetic acid, there is collected 27 parts by weight (80.6 per cent of the theoretical) of 1,1,5-trichloropentene-1.

*Example IV*

A mixture of 238 parts by weight of 1,1,1,7-tetrachloroheptane, 5 parts by weight of anhydrous zinc chloride, and 30 parts by weight of glacial acetic acid is heated and stirred vigorously at 140–160° C. for 3.5 hours. At the end of this time, the hydrogen chloride evolution has practically ceased, and the reaction product is taken up in methylene chloride, washed with water, dilute aqueous potassium hydroxide, water, and saturated calcium chloride solution. After drying over anhydrous magnesium sulfate, the solvent is distilled and the product is purified by distillation through a column. There is obtained 130 parts of 1,1,7-trichloroheptene-1, which is a clear, colorless liquid boiling at 98–101° C. under 8 mm. pressure and having an $n_D^{27}$ of 1.4840. The yield is 64.5 per cent of the theoretical.

By a similar procedure, 1,1,1,9-tetrachlorononane is converted to 1,1,9-trichlorononene-1, which is a liquid boiling at 108–111° C./3 mm.

*Example V*

A mixture of 57 parts by weight of formamide and 10 parts by weight of 1,1,1-trichlorononane, which is prepared by the telomerization of ethylene and chloroform (see copending application Serial No. 438,466, filed April 10, 1942 (C. C. D. 1954), is refluxed at the boiling point of the formamide for one hour. The product is isolated by steam distillation, and is taken up in methylene chloride, dried over anhydrous magnesium sulfate, and distilled. The product is 1,1-dichlorononene-1 which is a clear liquid boiling at 90° C./10 mm. and having an $n_D^{25}$ of 1.4579.

*Example VI*

To a refluxing solution of 54 parts by weight of potassium hydroxide in 350 parts by weight of absolute ethanol, there is slowly added 50 parts by weight of 1,1,1,5-tetrachloropentane. The reaction mixture is refluxed and stirred for an additional 5 hours. It is then cooled, the potassium chloride separated by filtration, and the ethanol evaporated for the most part from the filtrate on a steam bath. The residue is taken up in methylene chloride, washed well with water, dried over anhydrous magnesium sulfate, and distilled. By distillation through a precision column, there are isolated 2 compounds boiling at 66° C./24 mm. and 87° C./23 mm. which are, respectively, $C_2H_5O(CH_2)_3C \equiv CCl$ and $C_2H_5O(CH_2)_3CH = CCl_2$.

As additional examples of compounds of the type

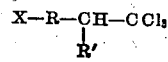

which can be used in the process of this invention may be mentioned 1,1,1-trichloropentane, 1,1,1-trichlorononane, 1,1,1-trichloro-2,4-dimethylpentane, 1,1,1-trichlorotridecane, 1,1,1,15-tetrachloropentadecane, 1,1,1-trichloro-3,3,5,5-tetramethylpentane, 1,1,1-trichloro-5-bromopentane, 1,1,1-trichloro-7-iodoheptane, and 1,1,1-trichloro-5-fluoropentane.

The hydrocarbon radicals R and R′ need not be aliphatic. They can also be aryl or mixed aryl aliphatic radicals. However, the presence of an aryl group in the compound to be dehydrochlorinated complicates the reaction if a Friedel-Crafts catalyst is used inasmuch as the normal dehydrochlorination product would not be obtained because of secondary Friedel-Crafts type reactions.

As has before been indicated, the vapor phase dehydrochlorination is the preferable procedure. Preferably, this is carried out at atmospheric or slightly above atmospheric pressure, although the use of superatmospheric pressure is within the scope of the invention. However, subatmospheric pressures may sometimes be employed to advantage, especially when dehydrochlorinating high boiling compounds which are difficult to vaporize at atmospheric pressure. In general, high pressures are not preferred since secondary reactions are promoted thereby. The vapor phase dehydrochlorination proceeds satisfactorily between about 200° C. and 450° C. The temperature range of 250° C. to 350° C. is preferred. The vapor phase reaction is especially applicable to raw materials having not more than 15 carbon atoms in the molecule. Compounds of from 5 to 15 carbon atoms are preferred for the vapor phase reaction.

In carrying out the vapor phase process, it is preferable to use a diluent, water being particularly desirable. The ratio of water to raw material is not particularly critical, but, in general, a molecular ratio of water to trichloromethyl compound of between 1:1 and 20:1 is most satisfactory.

As catalysts suitable for the vapor phase dehydrochlorination, it is preferred to use heteropoly acids, as defined in Ephraim, Inorganic Chemistry, English edition, Gurney & Jackson (1934), p. 434. More specifically, the use of heteropoly acids of which one radical is selected from those elements comprising groups V and VI—A of the periodic table is preferred. As examples of such acids, there may be mentioned phosphotungstic, silicotungstic, phosphomolybdic, borophosphoric, and silicovanadic acids. These catalysts can be used as such or they can be supported on a suitable material, such as charcoal, silica gel, alumina gel, quartz, etc. The catalyst is preferably employed in a granular or pelleted form.

Another group of materials which is effective as catalysts for the vapor phase dehydrochlorination consists of the chlorides of metals of groups II, III, and VIII of the periodic table, such as $MgCl_2$, $ZnCl_2$, $BaCl_2$, $AlCl_3$, $FeCl_3$, etc.

The preferred space velocity is naturally that just low enough to allow practically complete conversion in one pass through the catalyst bed. Complete conversion of 1,1,1,5-tetrachloropentane at 305° C. over phosphotungstic acid on silica gel with a space velocity of 2 cc. of total liquid feed per cc. of catalyst per hour has been achieved. The optimum space velocity is dependent upon the particular raw material, the temperature pressure, nature of catalyst, etc., but will generally be within the range of 1 to 5 cc. of chloro compound per cc. of catalyst per hour.

The reactor can be constructed of any material which is impervious to the attack of aqueous hydrogen chloride at elevated temperatures. Hastelloy, glass, etc., are suitable materials.

The liquid phase dehydrochlorination is preferably carried out in the temperature range 100–200° C. Below 100° C., the reaction is generally unsatisfactorily slow, and above 200° C., secondary changes begin to take place. An inert solvent can be used, but is not necessary. If one is employed, it is preferable to select one which is sufficiently high boiling so that superatmospheric pressure need not be employed to maintain reaction temperature. The preferred catalysts for the liquid phase dehydrochlorination are the halide-type Friedel-Crafts catalysts, such as zinc chloride, aluminum chloride, ferric chloride, stannic chloride, titanium tetrachloride, etc.

The rate of reaction in the liquid phase dehydrochlorination just discussed can be much accelerated by the use of a promoter. Accordingly, it is preferred to operate this process in the presence of hydroxylic promoters. By this term is meant a compound capable of reacting with the halide catalysts to produce free hydrogen chloride. Aliphatic acids and water are examples of suitable hydroxylic promoters.

The substances capable of bringing about the alkaline dehydrochlorination include oxides, hydroxides, and carbonates of alkali and alkaline earth metals, such as calcium oxide, sodium hydroxide, potassium carbonate, etc.; tertiary amines such as pyridine, quinoline, triethylamine, etc.; and aliphatic amides such as formamide, acetamide, etc. These materials can be used either as such or dissolved in a suitable solvent dependent upon their physical properties, e. g., alcohols in the case of alkali hydroxides.

The chlorinated olefins produced by this invention tend to oxidize in contact with air. Accordingly, it is preferable to store these products in closed containers together with a small quantity of an oxidation inhibitor, such as hydroquinone, pyrogallol, or an aliphatic tertiary amine, e. g., triethylamine. When stored under these conditions, the compounds are stable over long periods. The products can also be preserved against oxidation by storage in an oxygen-free atmosphere.

Many of these compounds are new. Thus, compounds of the formula $$X-R-C=CCl_2$$
$$\quad\quad\quad |$$
$$\quad\quad\quad R'$$

wherein X is a member of the group consisting of hydrogen and halogen, R is a divalent hydrocarbon radical of at least three carbon atoms, and R' is a member of the group consisting of hydrogen and hydrocarbon radicals have never been made before. Straight chain compounds of the formulae $H-(CH_2)_n-CH=CCl_2$ and $$Cl-(CH_2)_n-CH=CCl_2$$

wherein n is an integer greater than two are especially valuable.

The compounds prepared by the process of this invention are useful as solvents in coating compositions, as cleaning fluids and as metal degreasing solvents. They are also useful as intermediates for the synthesis of other desirable materials. For example, as disclosed in copending application Serial No. 438,467, filed April 10, 1942 (C. C. D. 1968), they can be hydrolyzed to the corresponding carboxylic acids by treatment with water in the presence of concentrated sulfuric acid. Indeed, it is often advantageous to use the dehydrochlorinated compound instead of the parent trichloro compounds for this reaction, since the hydrolysis of the former often proceeds more smoothly and under less rigorous conditions than are required for the latter.

It is apparent that many widely different embodiments of this invention can be made without departing from the spirit and scope thereof, and, therefore, it is not intended to be limited except as indicate in the appended claims.

I claim:

1. Process for the preparation of compounds of the formula $$X-(CH_2CH_2)_n-CH_2-CH=CCl_2$$

wherein n is an integer not more than six and X is a member of the class consisting of hydrogen and halogen, which comprises passing a compound of the formula $$X-(CH_2CH_2)_n-CH_2-CH_2-CCl_3$$

wherein n and X are as above, together with steam over a heteropolyacid catalyst at a temperature of 200–450° C.

2. Process for the preparation of compounds of the formula $$X-(CH_2CH_2)_n-CH_2-CH=CCl_2$$

wherein n is an integer not more than six and X is a member of the class consisting of hydrogen and halogen, which comprises passing a compound of the formula $$X-(CH_2CH_2)_n-CH_2-CH_2-CCl_3$$

wherein n and X are as above, together with steam over a heteropolyacid catalyst at a temperature of 200–450° C. and a space velocity of from one to five volumes of chloro compound per volume of catalyst per hour.

3. Process for the preparation of compounds of the formula $$Cl-(CH_2CH_2)_n-CH_2-CH=CCl_2$$

wherein n is an integer not more than six, which comprises passing a compound of the formula $$Cl-(CH_2CH_2)_n-CH_2-CH_2-CCl_3$$

wherein n is as above, together with steam over phosphotungstic acid supported on silica gel at a temperature of 200–450° C.

4. A compound of the formula $$Cl(CH_2CH_2)_{n-1}CH_2CH=CCl_2$$

wherein n is an integer greater than one

5. A compound of the formula $$ClCH_2CH_2CH_2CH=CCl_2$$

6. A compound of the formula $$ClCH_2CH_2CH_2CH_2CH_2CH=CCl_2$$

ROBERT M. JOYCE, JR.

Certificate of Correction

Patent No. 2,410,541.   November 5, 1946.

ROBERT M. JOYCE, JR.

It is hereby certified that errors appear in the printed specification of the above numbered patent requiring correction as follows: Column 2, line 3–4, for that portion of the formula reading $$\begin{array}{c} CH- \\ | \\ R' \end{array} \quad \text{read} \quad \begin{array}{c} C= \\ | \\ R' \end{array}$$

lines 16–17, in the formula, for "H—R" read $X$—$R$; and that the said Letters Patent should be read with these corrections therein that the same may conform to the record of the case in the Patent Office.

Signed and sealed this 24th day of December, A. D. 1946.

[SEAL]

LESLIE FRAZER,
*First Assistant Commissioner of Patents.*